United States Patent
Wong et al.

(10) Patent No.: US 9,161,073 B2
(45) Date of Patent: *Oct. 13, 2015

(54) SYSTEM AND METHOD TO REMOVE OUTDATED OR ERRONEOUS ASSETS FROM FAVORITES OR RECENTLY-VIEWED LISTS

(75) Inventors: Ling Jun Wong, Champaign, IL (US); Charles McCoy, Coronado, CA (US); True Xiong, San Diego, CA (US)

(73) Assignees: Sony Corporation, Tokyo (JP); Sony Network Entertainment International LLC, Los Angeles, CA (US)

( * ) Notice: Subject to any disclaimer, the term of this patent is extended or adjusted under 35 U.S.C. 154(b) by 132 days.

This patent is subject to a terminal disclaimer.

(21) Appl. No.: 13/216,700

(22) Filed: Aug. 24, 2011

(65) Prior Publication Data

US 2012/0209972 A1     Aug. 16, 2012

Related U.S. Application Data

(60) Provisional application No. 61/441,986, filed on Feb. 11, 2011.

(51) Int. Cl.
*G06F 15/173* (2006.01)
*G06F 15/16* (2006.01)
(Continued)

(52) U.S. Cl.
CPC ......... *H04N 21/2668* (2013.01); *H04N 21/442* (2013.01); *H04N 21/4826* (2013.01); *H04N 21/6582* (2013.01)

(58) Field of Classification Search
CPC ......... H04L 45/00; H04L 45/28; H04L 45/42; H04L 63/08; H04L 63/10; H04L 63/12; H04L 12/00; H04L 12/462; H04L 41/12; H04L 41/0253

USPC .................................. 709/223, 224, 227, 239
See application file for complete search history.

(56) References Cited

U.S. PATENT DOCUMENTS 5,444,837 A * 8/1995 Bomans et al. ............... 345/440
5,635,989 A   6/1997 Rothmuller
(Continued)

FOREIGN PATENT DOCUMENTS

CN    1504928    6/2004
CN    1989768    6/2007
(Continued)

OTHER PUBLICATIONS

"Prospecting Differences", http://www3.nsbar.org/technology/documents/Prospecting%20Module%20Update%200105.pdf. downloaded Oct. 2010.
(Continued)

*Primary Examiner* — Emmanuel L Moise
*Assistant Examiner* — Farzana Huq
(74) *Attorney, Agent, or Firm* — Mark D. Wieczorek; Mayer & Williams PC

(57) ABSTRACT

Systems and methods for creating and employing software to handle the playback of media, especially video, in browsers that, in addition to or instead of playing the media in the browser, may use second display protocols to instruct a separate display device to play the media. In one implementation, the software may be in the form of a web or other application. In particular, systems and methods are provided that describe ways to clean up bad assets from favorites or recently-viewed lists. In one implementation, systems and methods are provided that use an erroneous asset report from one user to fix other users' associated lists. In another implementation, the systems and methods employ data about defunct services, both local and global, to remove assets from those services from one or more user lists.

14 Claims, 7 Drawing Sheets

(51) Int. Cl.
*H04N 21/2668* (2011.01)
*H04N 21/442* (2011.01)
*H04N 21/482* (2011.01)
*H04N 21/658* (2011.01)

(56) References Cited

U.S. PATENT DOCUMENTS

| | | |
|---|---|---|
| 5,790,935 A | 8/1998 | Payton |
| 6,411,996 B1 | 6/2002 | Albers |
| 6,438,580 B1 | 8/2002 | Mears et al. |
| 6,601,173 B1 | 7/2003 | Mohler |
| 7,136,571 B1 | 11/2006 | Degtas |
| 7,389,523 B2 | 6/2008 | Kikinis |
| 7,480,694 B2 | 1/2009 | Blennerhassett et al. |
| 7,853,715 B1 * | 12/2010 | Katukam et al. ............. 709/239 |
| 7,962,948 B1 | 6/2011 | Girouard et al. |
| 7,970,922 B2 | 6/2011 | Svendsen |
| 8,028,314 B1 | 9/2011 | Sezan et al. |
| 8,234,672 B2 | 7/2012 | Morse et al. |
| 8,255,791 B2 | 8/2012 | Koren |
| 8,527,877 B2 | 9/2013 | Wohlert |
| 8,566,873 B2 | 10/2013 | Sie |
| 8,631,437 B2 | 1/2014 | Schwesinger et al. |
| 2001/0021305 A1 | 9/2001 | Sugiyama et al. |
| 2002/0152461 A1 | 10/2002 | Istvan |
| 2003/0056216 A1 | 3/2003 | Wugofski et al. |
| 2003/0206554 A1 | 11/2003 | Dillon |
| 2004/0002947 A1 | 1/2004 | De La Fuente et al. |
| 2004/0052505 A1 | 3/2004 | Ahmad et al. |
| 2004/0107169 A1 | 6/2004 | Lowe |
| 2004/0205569 A1 | 10/2004 | McCarty et al. |
| 2005/0041679 A1 | 2/2005 | Weinstein |
| 2005/0057538 A1 | 3/2005 | Morse et al. |
| 2005/0149878 A1 | 7/2005 | White et al. |
| 2005/0210101 A1 | 9/2005 | Janik |
| 2006/0025073 A1 | 2/2006 | Benco et al. |
| 2006/0159109 A1 | 7/2006 | Lamkin et al. |
| 2006/0259867 A1 | 11/2006 | Watson et al. |
| 2006/0265408 A1 * | 11/2006 | Pini ............................ 707/100 |
| 2007/0011616 A1 | 1/2007 | Ording et al. |
| 2007/0048716 A1 | 3/2007 | Hsu et al. |
| 2007/0136778 A1 | 6/2007 | Birger et al. |
| 2007/0204308 A1 | 8/2007 | Nicholas et al. |
| 2008/0126936 A1 | 5/2008 | Williams |
| 2008/0155613 A1 | 6/2008 | Benya et al. |
| 2008/0168502 A1 | 7/2008 | Trauth |
| 2008/0181580 A1 | 7/2008 | Sakai et al. |
| 2008/0288536 A1 * | 11/2008 | Pfeiffer et al. ............. 707/104.1 |
| 2008/0295012 A1 | 11/2008 | Sloo et al. |
| 2008/0301732 A1 | 12/2008 | Archer et al. |
| 2009/0158340 A1 | 6/2009 | Patel et al. |
| 2009/0165051 A1 | 6/2009 | Armaly |
| 2009/0247096 A1 | 10/2009 | Walley et al. |
| 2009/0249418 A1 | 10/2009 | Alastruey Gracia et al. |
| 2009/0271283 A1 | 10/2009 | Fosnacht et al. |
| 2009/0271289 A1 | 10/2009 | Klinger et al. |
| 2009/0300203 A1 | 12/2009 | Virdi et al. |
| 2009/0300204 A1 | 12/2009 | Zhang et al. |
| 2010/0042642 A1 | 2/2010 | Shahraray et al. |
| 2010/0071076 A1 | 3/2010 | Gangotri |
| 2010/0076946 A1 | 3/2010 | Barker et al. |
| 2010/0077309 A1 | 3/2010 | Miyada |
| 2010/0131978 A1 | 5/2010 | Friedlander et al. |
| 2010/0169778 A1 | 7/2010 | Mundy et al. |
| 2010/0235788 A1 | 9/2010 | Zappa et al. |
| 2010/0293598 A1 | 11/2010 | Collart et al. |
| 2011/0004519 A1 | 1/2011 | Aleong et al. |
| 2011/0015985 A1 | 1/2011 | Curtis |
| 2011/0047565 A1 | 2/2011 | Nakase |
| 2011/0176787 A1 | 7/2011 | DeCamp |
| 2011/0321093 A1 | 12/2011 | McRae |
| 2011/0321100 A1 | 12/2011 | Tofighbakhsh |
| 2012/0011588 A1 * | 1/2012 | Milener et al. ................ 726/24 |
| 2012/0066186 A1 | 3/2012 | Wohlert |
| 2012/0092438 A1 | 4/2012 | Suarez et al. |
| 2012/0117587 A1 | 5/2012 | Pedlow et al. |
| 2012/0139938 A1 | 6/2012 | Khedouri et al. |
| 2012/0151015 A1 | 6/2012 | Plastina et al. |
| 2012/0210220 A1 | 8/2012 | Pendergast et al. |
| 2012/0210238 A1 | 8/2012 | McCoy et al. |
| 2012/0210245 A1 | 8/2012 | McCoy et al. |
| 2012/0254755 A1 | 10/2012 | Wohlert |
| 2012/0296934 A1 | 11/2012 | Carpenter et al. |
| 2013/0024206 A1 | 1/2013 | Hughes et al. |
| 2013/0024539 A9 | 1/2013 | Khedouri et al. |
| 2013/0111347 A1 | 5/2013 | Reilly et al. |
| 2013/0115974 A1 | 5/2013 | Lee et al. |
| 2013/0174035 A1 | 7/2013 | Grab |
| 2013/0179931 A1 | 7/2013 | Osorio et al. |

FOREIGN PATENT DOCUMENTS

| | | |
|---|---|---|
| CN | 101438580 | 5/2009 |
| WO | 2009129584 A1 | 10/2009 |
| WO | 2010117610 | 10/2010 |

OTHER PUBLICATIONS

Vijamaa, Unified Media Functions for Mobile Multimedia Devices ACM 2008, pp. 1-8.
Lee et al., Personalized Contents Guide and Browsing based on User Preference, Google 2002, pp. 1-10/.
Mrazovac et al., Smart Audio/Video Playback Control based on PResence Detection and User Localization in Home Environment, IEEE 2011, pp. 44-53.
Office Action in Corresponding Chinese Patent Application No. 201210023250.8 dated Sep. 19, 2014, 8 pages.

* cited by examiner

SYSTEM AND METHOD TO REMOVE OUTDATED OR ERRONEOUS ASSETS FROM FAVORITES OR RECENTLY-VIEWED LISTS

STATEMENT OF RELATED APPLICATIONS

This application claims the benefit of U.S. Provisional Patent Application Ser. No. 61/441,986, filed Feb. 11, 2011, entitled "Method to Clean Out Outdated or Erroneous Assets from Favorites List or Recently-Viewed Lists", which is owned by the assignee of the present invention and incorporated by reference herein in its entirety.

BACKGROUND

Internet delivery of digital content to IPTVs continues to increase, as does the popularity of IPTVs themselves. Digital content is in many cases provided by service providers or just "services". However, services sometimes change over time, as does a user's access to them. For example, services may be combined or change names, and a user's subscription to such services may lapse or change in its access to various assets. Where services are no longer available for a content playback device, the assets of the service are improper to display.

The availability of assets changes even more than that of services. One reason is that it is normal for services to change their assets over time, or to change the way in which assets are organized, e.g., categorized. One feature users may typically access is a list of favorites or a list of recently-viewed assets. If a user accesses such a list, and the list contains assets that are outdated, erroneous, or point to a broken link, the user inconveniently receives an error message relating to the same, which are termed here as "bad" assets.

SUMMARY

Systems and methods are disclosed for providing a favorites list of assets or content items (the terms are used interchangeably), or a recently-viewed list, in which the list may be updated to remove bad assets. In some cases, a user attempting to playback a bad asset may cause the asset to be removed, even without access of a favorites or recently-viewed list. The user may cause not only their own list to be updated, but that of other users on the system, as notification of a bad asset may be propagated through to every list that includes that asset. The propagation may be to users completely unrelated to the user whose playback caused the identification of the bad asset. In this way, most users whose lists contain bad assets will have those bad assets removed seamlessly, with little disruption of their activities.

In one implementation, the following exemplary sets of steps may be performed. Initially it is noted that there are at least two scenarios where an asset may go "bad". One is where the asset is no longer available, and in this case the service provider has removed the asset. Another is where the service itself is removed from the content playback device, hence the asset hosted by the service should no longer be presented to the user.

For the first case, a first step is that, on the second display, the user selects the asset for playback. The content playback device responds by attempting to playback the asset. The content playback device in some way receives an error about the bad asset and reports to the server, e.g., a management server, about the error condition. The management server marks the asset as erroneous, and an investigation is made on the asset. If the asset URL is no longer valid, the asset is removed from the second display system. This means that all users of second displays may have their lists updated to remove the asset from their lists. If the asset is only bad for the content playback device, the asset remains in the system, with the same simply marked as "bad" for the content playback device. In this way, the vast majority of users will not experience the erroneous asset because someone has already helped clean their list of that erroneous asset.

For the second case, the second display requests the lists of favorites or recently-viewed assets from the server, which again, may be a management server. The management server retrieves the current list of services for the content playback device. The management server compares the current list of services of the content playback device with the global list of services from the second display usage logged by the user in their system. The resulting list is the intersection or common list of services in both lists specified in the prior step. In this respect it is noted that the assets are associated with their respective service providers, so filtering out the services also filters out the corresponding assets as well. This resulting list is returned to the second display. In this way, the user only sees the assets they have sufficient permissions to see.

A number of variations will be seen. For example, assets may become "bad" in a number of ways, such as by being renamed. In particular, if an asset identifier is in any way changed, the same may become unknown by stored lists, and may have to be rediscovered and re-input into user lists of various types. In many cases, the presence of a bad asset will only become known when a user requests the asset, as asset playback information is in some cases stored on the client side. Thus, the same are more difficult to clean out in a rapid basis, but require the connection of the second display or the content playback device to the management server. Assets may also become bad if the underlying service provider has in some way disabled them, such as by re-encoding the assets.

In a particular configuration, the user may be given considerable control over this process. For example, the user may choose whether assets are cleaned automatically or only upon user direction.

In some implementations the software on the second display, or second display application, can be in the form of web application that works in association with a web browser, and which may even allow certain items to be played back on the second display. The use of the same allows significant benefits over prior systems. For example, the system and method may be employed with any device with a browser, and is not tied to any particular proprietary technology.

To accomplish the above, software is employed that is installed, in one implementation, on a second display to control and handle media playback. This software may have the ability to play the media in the browser, like traditional media handling software, in addition to the ability to control consumer electronics devices to enable the same to play the media. The software may specify the network location of selected media to content playback devices. The content playback devices, e.g., consumer electronics devices, may be caused to be the source of the request for a content item from a service provider, e.g., by providing the content item URL to the content playback device from the second display for a subsequent request to a service provider.

In the case that the software includes a plug-in within the browser to playback content items in the browser, the browser may provide the media data to the plug-in in a stream. The plug-in can buffer the media stream and direct the content item to the consumer electronics device that it instructed to play the media. The second display application may also prepare and update the browsing history that is presented to the user by the browser.

The second displays provide complementary functionality to the IPTV, but generally do not require additional investment by the user because the same make use of a device, e.g., a smartphone, laptop computer, tablet computer, a desktop, an internet appliance, etc., which most users would already have in their possession. Such a second display is a desirable complement to an IPTV because of the second display's strength in supported languages and character font sets, data entry, processing power, and user experience in content management. The application running on the second display may be a web application (scripting or non-scripting), a native application, a Java application, or any other sort of application that may be employed with a content playback device. For example, the ASP/.NET framework with RPC can be employed to write the second display application. Where the web application running on the second display is written in HTML or HTML with Javascript, the same may be loaded by any device with a browser, and so the same is not limited to only a small set of compatible devices or expensive remote controls.

Communications with service providers may take place through a proxy server, and the proxy server presents to service providers the authentication credentials of the content playback device, so that the second displays appear to the service providers as authenticated content playback devices.

The second displays may include any device that can run an application that communicates with a content playback device, including, but not limited to, personal computers, laptop computers, notebook computers, netbook computers, handheld computers, personal digital assistants, mobile phones, smart phones, tablet computers, hand-held gaming devices, gaming consoles, and also on devices specifically designed for these purposes, in which case the special device would include at least a processor and sufficient resources and networking capability to run the web application.

The content playback device can take many forms, and multiple content playback devices can be coupled to and selected within a given local network. Exemplary content playback devices may include IPTVs, DTVs, digital audio systems, or more traditional video and audio systems that have been appropriately configured for connectivity. In video systems, the content playback device includes a processor controlling a video display to render content thereon.

In a general method, a user employing a second display has a user account with a source or clearinghouse of services. Here, the source or clearinghouse is represented as a user account on a management server, but it should be understood that the user account may be with a service provider directly. In any event, this account has information stored thereon related to what content playback devices are associated with the account. When a user logs on, they may see this list of content playback devices and may choose a particular content playback device. If there is only one content playback device on the network, or if the user is browsing in a way that the content playback device identity is not needed, then this step may be omitted.

Once a content playback device has been chosen, a list of services may be displayed (if more than one is available). The list of services may be customized to those that have content playable on the chosen content playback device, or all available content may be displayed, in which case, in certain implementations, a notation may be displayed adjacent the content item as to whether it is playable on the selected device. Where no content playback device has been selected, all available content may be displayed. If no content playback device has been selected, but the user account includes stored information about which content playback devices are available, then all content may be displayed, a subset of all content may be displayed based on the known content playback devices associated with the account, or notations may be presented about which content playback devices can play which content, or a combination of these. In some cases, a content service provider may require a content playback device to be chosen. In other cases, no content playback device need be chosen and the user may simply choose and queue content for later playback by a content playback device to-be-determined at a later time.

In addition to a list of available services, a list of favorite services and/or assets may be displayed. Such lists, and other lists including recently-viewed lists, may be updated and managed using systems and methods according to the principles disclosed here. If a content playback device has been selected, the lists updated by the principles disclosed here may be filtered so that the same only display those services suitable for receipt by the selected content playback device.

Assuming multiple services are available, the user then selects a service to browse. The service presents a list of available content items as noted above. The presentation may be in any number of forms, including by category, or in any other form of organization. The proxy server presents an authentication credential of the content playback device to the content server. In some cases, service provider credentials for accessing the various services may be stored in the account, and presented by the proxy server or management server to the content server when needed.

If the service selected by the user has been chosen from a filtered list of services available to the selected content playback device, only those content items associated with the selected service which are suitable for receipt by the selected content playback device may be displayed. For favorites lists, the same may be filtered at the services level and at the content item level so that the user is only presented with those content items that can be utilized by the selected content playback device. The filtering may occur on the server side or at the second display.

Individual services may employ their own DRM schemes which the current system may then incorporate. For example, if a video content service provider only allows a certain predetermined number of devices on which their content may be played back, then this rule will be enforced or duplicated within the current system and method. Moreover, changes to such service provider parameters may be periodically polled for by the proxy server and/or management server, or the same may be polled for at the next login of the service. In other words, upon login, the system and method may poll for and receive a token associated with the given service provider, the token providing information to the system about the user account with the content service provider.

The system and method may include a management server which, along with the content playback device, communicates with at least one content server such that the content server provides content items for presentation or access of the content item at the content playback device. The system and method may further include a proxy server communicating with the management server and the second displays. In some cases, the proxy server may be merged with the management server, or in other cases a separate proxy server may be provided for each content server or service provider. In another aspect, a proxy server includes at least one processor and at least one network interface communicating with the processor to establish communication between the processor and a wide area network. At least one computer-readable storage medium is accessible to the processor and bears logic causing the processor to receive login information from a second display. Responsive to a determination that the login information is correct, the server sends to the second display a local IP address of the content playback device associated with the login information. The proxy server receives from the second display information about the content playback device requesting a list of services available to the content playback device from at least one content server of a service provider and sends a request for the list of services to a management server. The proxy server receives from the management server the list and sends it to the second display for presentation of information on a video display thereof. In addition, the proxy server may send to the second display the list of favorite services and/or assets, which may be filtered so that it only includes those services or assets which are available to the specified content playback device. In some cases the list may be obtained from the management server or the content server. The filtering of the list to tailor it for the specified content playback device may be performed by the management server, the content server, or the proxy server.

After the second display selects a service, the proxy server sends to the second display a list of content items provided by that service. The proxy server may also send to the second display a list of favorite content items associated with the user and provided by that service. In some cases the list may be obtained from the management server or the content server. Such lists, and other similar lists including recently-viewed lists, may be updated and maintained to eliminate bad or erroneous assets or content items according to the principles described here.

The proxy server receives from the second display a request for a content item and, responsive to the request of the content item, requests a service login of the content server. The proxy server receives back from the content server a list of items, assets, categories or services and sends the list to the second display. In this way, the list can be presented on a video display of the second display so that a user can navigate to enter a selection to command the content playback device to play the selection.

In one aspect, the invention is directed towards a method of updating a list of content items, including: establishing a browsing session between a second display and a server, and associating the browsing session with a user account of a user; receiving a selection of a content playback device; navigating to a service; requesting playback of an asset from the service by sending a first signal to the server, the first signal causing the service to attempt playback of the asset on the selected content playback device using the credentials of the content playback device; and upon an unsuccessful attempt to playback the asset, sending a second signal to the server, whereby the asset is noted as a bad asset.

Implementations of the invention may include one or more of the following. The list may be a list of favorites or a list of recently-viewed assets. The server may be a management server. The second signal may be sent automatically or upon user direction or upon receipt of an error message from the content playback device. The navigating to a service may include selecting the service from a list of favorite services.

In another aspect, the invention is directed towards a non-transitory computer-readable medium, comprising instructions for causing a computing device to implement the above method.

In another aspect, the invention is directed towards a method of updating a list of content items associated with a first user account, including: establishing a browsing session between a second display and a server, the browsing session associated with a first user account; receiving a selection of a content playback device; receiving a request for playback of an asset from a service, and causing the service to attempt playback of the asset on the selected content playback device using the credentials of the content playback device; upon receiving a signal from the second display or the content playback device indicating that the attempt was unsuccessful, marking the asset as bad; and determining if the asset URL is no longer valid, and if the asset URL is no longer valid, removing the asset from at least one list of content items including the asset, the list associated with the first user account, and further removing the asset from at least one other list of content items; or determining if the asset is bad for the selected content playback device, and if the asset is bad for the selected content playback device, then marking the asset bad in at least one list containing the asset, the list associated with the user account and for the selected content playback device.

Implementations of the invention may include one or more of the following The list may be a list of favorites or a list of recently-viewed assets. The server may be a management server. The at least one other list may be associated with a second user account or with the first user account. The method may further include discovering a new URL for the asset, and replacing the removed asset URL with the new URL, in the lists of content items associated with the first user account and with the other list of content items.

In another aspect, the invention is directed towards a non-transitory computer-readable medium, comprising instructions for causing a computing device to implement the above method.

In another aspect, the invention is directed towards a method of updating a list of content items associated with a first user account, including: establishing a browsing session between a second display and a server, and associating the browsing session with a first user account; receiving a selection of a content playback device; receiving a request for a list of content items; retrieving a current list of services associated with the selected content playback device; comparing the list from the retrieving step with a list of services determined from usage of the second display; determining an intersection of the list from the retrieving step with the list of services determined from usage of the second display; filtering, from the list of content items, any content items from services not in the intersection; and returning the filtered list of content items to the second display.

Implementations of the invention may include one or more of the following. The list may be a list of favorites or a list of recently-viewed assets. The server may be a management server. The list of services determined from usage of the second display may include services visited from all second displays associated with the user account.

In another aspect, the invention is directed towards a non-transitory computer-readable medium, comprising instructions for causing a computing device to implement the above method.

Advantages of certain embodiments of the invention may include one or more of the following. Additional ways are provided to control TVs through a secondary display. Erroneous or outdated assets may be automatically removed from a user's favorites or recently-viewed lists, thereby increasing user convenience and decreasing confusion.

Other advantages will be apparent from the description that follows, including the figures and claims.

BRIEF DESCRIPTION OF THE DRAWINGS

Like reference numerals indicate like elements throughout.

DETAILED DESCRIPTION

Figure 1:
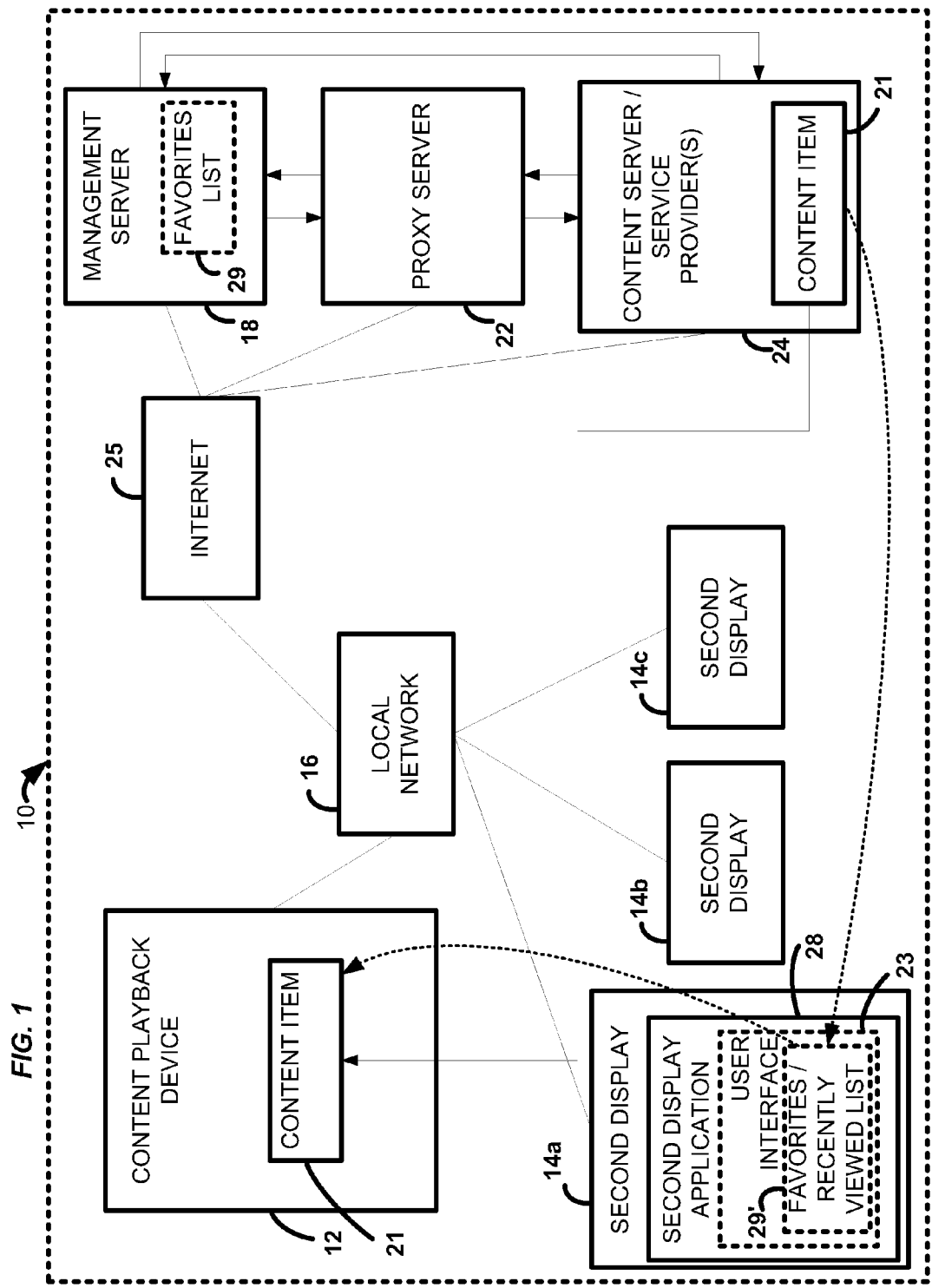
FIG. 1 is a block diagram of an exemplary system in accordance with one aspect of the present principles.

Referring initially to FIG. 1, a system 10 is shown including a content playback device 12 coupled to a local network 16, which may be wired, wireless, or a combination of both. Also coupled to the local network 16 are one or more second displays 14a-14c, an exemplary one of which is termed herein second display 14i. A number of servers may be accessed by the content playback device 12 and the second display 14i through the local network 16 and the internet 25, including a management server 18, a proxy server 22, and one or more content servers 24 corresponding to service providers.

A content item 21 may be stored on a content server 24 and the same may be selected, or in certain cases even in part viewed, by a second display 14a. In particular, the content item 21 may be browsed and selected using a second display application 28, which in some embodiments may be a web application. In some cases, particularly when a conventional web browser is employed, a plug-in or helper application (not shown) may run in the browser to facilitate viewing of the content item in the second display. The user of the second display 14a can then direct that the content item be displayed in the content playback device 12. In so doing, the user can, e.g., employ a user interface 23 of the second display application 28 to indicate this direction. A signal is then transmitted from the second display 14a to cause the content item 21 to playback on the content playback device 12.

The content playback device 12 may obtain the content item 21 for playback in a number of ways. Generally, the content playback device 12 receives the content item 21 from the service provider (or an intermediary source). For this type of transmission, the second display 14a may send a signal to the service provider through the local network 16 and/or internet 25 to the service provider. In another case, where the second display application is a web application, the same may include JavaScript in HTML that directly passes the desired URL onto the content playback device. If necessary, the proxy server 22 may be employed, although in some cases content items 21 suitable for viewing in the second display application 28 may be obtained directly from the service provider. Many of these include DRM-free content or other freely-distributable content. In any case, other details about methods by which a second display may request that a content item appear on a content playback device are described below.

In some cases, the second display 14a may directly transmit the content item 21 to the content playback device 12. This direct transmission may be by way of a direct wired or wireless connection, such as via USB, Wi-Fi, or the like. For such direct transmissions, the second display 14a may act to buffer the media stream constituting the content item 21 in some implementations.

The content playback device 12 may be, e.g., an IPTV, a digital TV, a digital sound system, a digital entertainment system, a digital video recorder, a video disc player, a combination of these, or any number of other electronic devices addressable by a user on the local network 16. For the sake of simplicity, in this specification, the content playback device 12 will generally be exemplified by an IPTV, in which case it will typically include a processor that controls a visual display and an audio renderer such as a sound processor and one or more speakers. The processor may access one or more computer-readable storage media such as but not limited to RAM-based storage, e.g., a chip implementing dynamic random access memory (DRAM), flash memory, or disk-based storage. Software code implementing present logic executable by the content playback device 12 may also be stored on one of the memories shown to undertake present principles. The processor can receive user input signals from various input devices including a remote control device, a point-and-click device such as a mouse, a keypad, etc. A TV tuner may be provided in some implementations, particularly when the content playback device 12 is embodied by an IPTV, to receive TV signals from a source such as a set-top box, satellite receiver, cable head end, terrestrial TV signal antenna, etc. Signals from the tuner are then sent to the processor for presentation on the display and sound system. A network interface such as a wired or wireless modem communicates with the processor to provide connectivity to the Internet through the local network 16. It will be understood that communications between the content playback device 12 and the internet 25, or between the second display 14i and the internet, may also take place through means besides the local network 16. For example, the second display 14i may communicate with the content playback device 12 through a separate mobile network.

The one or more second displays 14a-14c each bear a processor and components necessary to operate an application, e.g., a second display application and possibly a browser plug-in or helper application. Other types of applications may also be employed, so long as the same are capable of transmitting (and optionally playing) the selected media or otherwise specifying the network location of the same to a target device for subsequent playback. In particular, the processor in the second display may access one or more computer-readable storage media such as but not limited to RAM-based storage, e.g., a chip implementing dynamic random access memory (DRAM), flash memory, or disk-based storage. Software code implementing present logic executable by the second display may also be stored on one of the memories shown below to undertake present principles. Further, the second display 14i can receive user input signals from various input devices including a point-and-click device such as a mouse, a keypad, a touchscreen, a remote control, etc. A network interface such as a wired or wireless modem communicates with the processor to provide connectivity to wide area networks such as the Internet as noted above.

The servers 18, 22, and 24 have respective processors accessing respective non-transitory computer-readable storage media which may be, without limitation, disk-based and/or solid state storage. The servers communicate with a wide area network such as the internet 25 via respective network interfaces. The proxy server 22 may in some cases be combined with the management server 18, although in many cases it may be preferable to separate the servers to better accommodate server load. The servers may mutually communicate via the internet 25. In some implementations, the servers may be located on the same local network, in which case they may communicate with each other through the local network without accessing the internet. For example, in one exemplary implementation, the management server 18 and the proxy server 22 may be disposed in the same data center, so communication between the two may stay within the data center.

While exemplary methods of the system are described below, certain method steps especially pertinent to certain arrangements of the second display will be described here.

Responsive to the second display 14*i* sending a request to the proxy server 22 for an executable utility, the proxy server 22 returns the utility to each second display 14*i*. Running the utility causes the instantiation of an application. The implementation discussed here includes a web application, but it will be understood that other types of applications may also be employed. The second display 14*i*, executing the web application, prompts a user to input to each second display 14*i* login information. The login information may be common or may differ between second displays. The proxy server 22, responsive to reception of correct login information from the content playback device 12, returns the local network (e.g., IP) address of the content playback device 12 to the second display 14*i*, because the same has previously been registered to a user account in which such information is maintained. The proxy server 22 may also return a list of content playback devices on the local network, responsive to which the second display 14*i* may select one for content playback. In turn, each second display 14*i* uses the local content playback device address to access the content playback device 12 directly to request information about the content playback device 12, which information is returned from the content playback device 12 to the second display 14*i* such that the local address of the content playback device 12 need not be globally addressable. Each second display 14*i* may also select content for playback on different content playback devices. The second display 14*i* sends the information about the content playback device 12 to the proxy server 22, requesting a list of services available to the content playback device 12 from one or more service providers. The services may be dependent on the device characteristics of the content playback device 12 chosen. For example, if the chosen content playback device 12 is an IPTV, video services may be returned. If the chosen content playback device 12 is an audio system, audio services may be returned.

The proxy server 22 relays the request for a list of services to the management server 18, which returns the list to the proxy server 22, with the proxy server 22 in turn sending the list to the second display 14*i* for presentation of information on the second display 14*i*. Responsive to a user selection of an item on the list, the second display 14*i* sends a request for a software asset corresponding to the selected content item to the proxy server 22. The proxy server 22 requests a service login of the content server 24 providing the content, and the content server 24 provides to the proxy server 22 a list of content items, assets, categories, or services, and the proxy server 22 relays the list to the second display 14*i*, which is presented on the second display 14*i* so that the user can navigate to enter a selection. Responsive to the selection, the second display 14*i* sends a command to the content playback device 12 to access and play back the selection.

The content server or servers 24 may maintain a list of favorite content items associated with the user's account or with the second display 14*i*. These lists provide a convenient method by which the user can quickly and easily access items of particular interest on different second displays or content playback devices. The content server 24 may provide this list to the user when the user requests the same from the content server 24. The list of favorites may be provided to the user on the second display 14*i* whenever the user accesses the content server 24 or only when specifically requested by the user.

In some implementations, especially those discussed below, the list of favorites and/or recently-viewed items may be maintained by the proxy server 22 or management server 18 instead of the content server 24. The server 18 or 22 may maintain the favorites list 29 or the second display 14*i* may maintain such a list 29', or both. Generally, in these cases, a list may include content items from multiple services. In such cases, it may not be practical or desirable for the user to request and receive a separate list from each of the content servers. To create these cumulative or global lists, each content server may send its list to the management server or proxy server. The management or proxy server can then combine the individual lists to create and maintain a global list that can be made available to the second display.

In any case, when the user accesses a service or selects a content item or other asset, a record may be created in which an asset identifier (ID) is associated with the user and stored on the appropriate server. The record may also associate an asset ID and user ID with the second display or content playback device from which the user request was received.

When a user receives a favorites list, that list may include all such assets associated with the user which have been selected as favorites, regardless of which device previously received the assets on the list. For instance, some of the assets may have been presented on content playback device 12 while other of the assets on the list may have been presented on another content playback device or on one of the second displays 14*a*-14*c*. However, not all assets may be suitable for receipt by or presentation on all the available devices. This may be particularly important where a selected device has a completely different set of capabilities as a previously selected device. For instance, assets that may be suitable for presentation on an IPTV may not be suitable for presentation on a DTV, a digital audio system, or a Blu-ray® player.

As one particular example, a first selected device may be an IPTV, and a second selected device may be an audio receiver. Some level of filtering may be desirable because the audio receiver cannot playback video content, and the ability to choose video content while the audio receiver is selected may lead to consumer confusion. Of course, in certain implementations, in the above scenario, a user may be given the option to playback merely the audio portion of a multimedia content item on an audio system. In another example, a first selected device may be an IPTV, and a second selected device may be a smart phone. In this case, multimedia content may be presented on the smart phone, but at a significantly different resolution than on a typical IPTV. In the same way, certain services or content items may not be available in certain regions for contractual or government reasons. Such services or content items may then be disabled or filtered out from displaying on a second display when the second display has selected a device in that region for playback. By filtering out these unavailable services and/or content items, consumer confusion can be greatly reduced because the consumer is no longer offered a choice of a service or content item that is unavailable.

Once the user designates to the proxy server 22 a particular content playback device 12 that is to receive an asset, the proxy server 22 may filter the favorites before providing the list to the user on the second display 14*i*. The filtering may be performed so that only those favorite assets suitable for receipt by the designated content playback device 12 will be included in the list(s). The proxy server 22 can perform this filtering process using the information about the designated device which was previously received from either the second display 14a or the designated content playback device 14 itself Accordingly, when the user receives the favorites list from the proxy server 22, either automatically or upon user request, the list may only show those assets that are available for the selected content playback device. In this way, the favorites list of content items, assets, categories, or services may be synchronized across all content playback devices registered to that user. It is noted that while the proxy server 22 has been described as performing this function, in many cases the management server 18 may also perform it, or the two may perform it together.

In those implementations in which the favorites list is provided to the user by the content server 24, the filtering process may be performed by the content server 24 (after receiving the necessary information from the proxy server 22) or the proxy server 22 (or management server) may perform the filtering process itself after receiving the list from the content server 24.

In another implementation, the filtering can also be performed by the second display application. In this case, the list that is played by the second display may be a global list of all favorite assets from various services, and may be performed based on the IPTV device that is currently selected, if any, by the second display application.

The command from the second display 14i to play the content item may be in a number of forms. The second display 14i may communicate to the proxy server 22 the request on behalf of the content playback device 12, and this request may be via the local network or via other means. Alternatively, the second display 14i may transmit a request to the content playback device 12 that it itself formulate the request, and this transmission may be by way of the local network, the internet generally, or via other means such as other wired or wireless transmission schemes, including via USB, IR, Bluetooth®, or any other schemes. If the second display 14i is configured to address the content playback device 12 at a non-local level, e.g., at the server level, then the second display 14i may be physically located virtually anywhere and still be able to queue content or to command the content playback device 12 to play content. In this case, however, server load would increase over the case where the second display and content playback device communicated directly or over a local network.

Certain method steps of an arrangement of the content playback device are described here. Using a network interface, the content playback device 12 can communicate with a management server 18 on the Internet and with the one or more content servers 24, also on the Internet and communicating with the management server 18. The management server 18 receives and stores a local IP address of the content playback device 12. The content playback device 12 communicates with the management server 18 to arrange for content items from the content server 24, operated by a service provider, to be played back on the content playback device 12. In more detail, the content playback device 12 sends login information to the management server 18 which returns to the content playback device 12 a user token that must subsequently be presented by the content playback device 12 to the content server 24 to obtain content from the content server 24.

Figure 2:
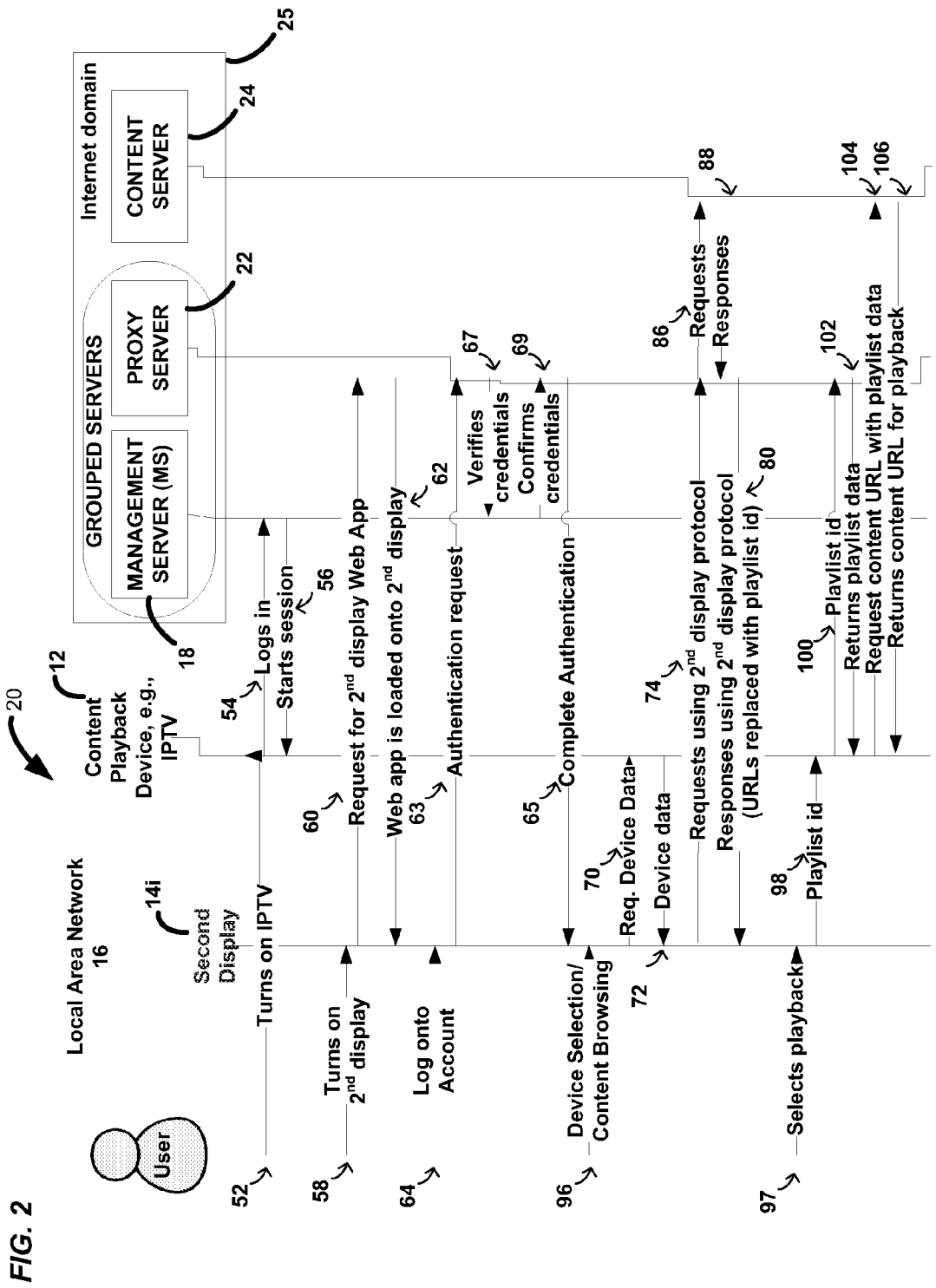
FIG. 2 is a sequence diagram illustrating a system and method according to another aspect of the present principles.

FIG. 2 is a sequence diagram illustrating an exemplary implementation of the system and method for enabling a user to employ a second display to browse content playback devices, service providers, and content items and select the same for playback by a content playback device. FIG. 2 assumes that the user has already created an account with a management server and has affiliated one or more content playback devices with that account.

At state 52, a user turns on the content playback device 12. At state 54 the content playback device sends login information including, e.g., username and password, to the management server 18, which at state 56 returns to the content playback device a user token that may subsequently be presented by the content playback device to a content server 24 to obtain content from that server. The management server 18 in addition stores the local IP address of the content playback device 12.

At state 58, the user turns on the second display 14i and, e.g., instantiates a session such as a web browser session in which control may be exercised over the content playback device. A utility is executed on the second display 14i, at state 60, which sends a request to the proxy server 22, which returns in state 62 an application, e.g., HTML with JavaScript, for the second display to execute for browsing content items. This application may make, e.g., asynchronous JavaScript and XML calls to the proxy server 22 and to the content playback device 12 to obtain information to control the content playback device 12.

With more specificity, at state 64, using the JavaScript received from the proxy server 22, the second display 14i prompts the user to input to the second display 14i the account login information, including, e.g., the same username and password that the content playback device provided to the management server 18 in state 54 during device registration. Of course, the account login information may differ as well. It will be appreciated that the servers 18, 22, and 24 communicate necessary account information between them as needed to realize the principles described here.

The proxy server 22 responds to a correct user name and password from the second display 14i in an authentication request state 63. The proxy server 22 verifies the user name and password with the management server 18 (states 67 and 69), creates and transmits a session token to the second display, obtains information about content playback devices affiliated with the user account, and completes the authentication in state 65. The proxy server 22 may return to each second display the information about all content playback devices 12 that are affiliated with the user account associated with the user name and password, including their local IP addresses which were stored by the management server 18 after login at 54 (and subsequently provided to the proxy server 22). In more detail, the proxy server 22 sends a token to the second display 14i, the token associated with a content playback device, and this token gets communicated in future transactions between the second display and the proxy server, so that the proxy server 22 knows what content playback device the content item is intended for. Each user with each second display may then choose a content playback device and browse the services and content options available through the services in state 96 and subsequent steps.

The second display 14i, using the local IP address returned as noted above, accesses the content playback device directly, in the sense of communicating through the local network. To select a particular content playback device, the second display 14i requests information about the content playback device 12 at state 70, including language information, digital rights management (DRM) information, etc., as desired, which information is returned from the content playback device to the second display 14i at state 72. Since the second display 14i knows the IP address of the content playback device 12 and consequently communicates directly with the content playback device 12, the second display 14i communicates using a local web address of the content playback device 12 that need not be globally addressable, and may so communicate as long as the second display 14*i* and content playback device 12 are on the same local network.

Each second display 14*i* may send the client information received at state 72 to the proxy server 22, requesting a list of services available to the content playback device 12, or that the content playback device 12 is entitled to, from one or more of the content servers 24. The proxy server 22 relays the request to the management server 18, which returns the requested service list to the proxy server 22. The proxy server 22 in turn sends the services list to the second display for presentation of available services on, e.g., the second display. In addition to the services, a favorites list may be provided to the second display. As previously discussed, this list may be filtered so that it only includes those services that are available to the content playback device 12 that was selected in state 96. Each user browses the services and their content on the second display just as though it were the actual content playback device.

A user can input, using, e.g., a second display input device, a selection of a service on the list that was returned to the second display. In response, the second display, at state 74, sends a request for the corresponding service to the proxy server 22 along with the service token that that second display may have received from the content server 24 via the management server 18.

Responsive to the request, the proxy server 22 requests a service login at state 86 of the content server 24 providing the selected service. At state 88, the content server 24 provides to the proxy server 22 a list of content items, assets, categories or services, as the case may be, for the particular content server 24. If desired, the proxy server 22 may also request of the content server 24 a list of options, and the list may be returned in, e.g., extended markup language (XML) format to the proxy server 22 which relays the content items, assets, categories, services, etc. available for selection to the second display at the state 80. If the filtered favorites list is provided by the content server 24 to the proxy server 22, this request from the proxy server 22 to the content server 24 may also include a request for such a filtered list.

The content available for selection is presented on the second display so that the user can navigate in state 97 the display to enter a selection. Responsive to the selection, the second display at state 98 sends a command to the content playback device 12 to play the selection, and in particular sends a playlist identifier or reference identifier indicating the selection. At state 100, the content playback device 12, using its authentication credentials, sends the playlist identifier or reference identifier to the proxy server 22, which returns the required playlist data in state 102. The content playback device 12 can then request the content URL with the playlist data in state 104, which may be responded to with a return of the content URL for playback of the content item on the content playback device 12 in state 106.

Variations of the system and method are now described.

If the content playback device were already playing content, the new content commanded to be played by the second display may interrupt the current content. Alternatively, the new content may be placed in a queue in the content playback device and played when the current content completes. In any case, once the content has been commanded to be played, the user may continue to browse the second display for other content, to play or to add to the queue. Other users may employ their own second displays to do the same. A user may also desire to switch devices and resume playback on a different device by, e.g., navigating to a "recently-viewed" list and selecting the last video played after switching control to the desired device. In the same way as noted above, the recently-viewed list may be filtered to only include those recently-viewed items available to the content playback device which has now been given control.

The above description has been for the case where the proxy server 22 is employed to hide the content source, e.g., a content URL, from the second display 14*i*. That is, the proxy server 22 provides an API for the second display to use so that the content and/or content URL cannot be accessed directly, i.e., the details of the management server transactions to access the services remain desirably unknown. In many cases, the second display 14*i* may have stored thereon little or nothing of the content playback device 12 details. In some cases, however, the URL may be directly provided from the proxy server 22 or the proxy server 22 may even be bypassed, e.g., in cases where the content item is intended for free distribution, e.g., movie trailers or the like. If the URLs are made available to the second display 14*i*, the list of favorites or other assets available to the user may be presented to the user through the second display application. If the second display application is, or includes, a web browser, the list may be presented in the native bookmarking feature often available in such web browsers.

Similarly, while the above description has focused on content item playback on content playback device 12, certain content items, e.g., those which are intended for free distribution, may be played back on the second display 14*i* itself, if the same has been appropriately configured, e.g., via using the second display application and/or the plug-in or helper application described.

In the case where multiple second displays request content to be played at or near the same time, a simple rule such as the first-in-time may prevail. Alternatively, a priority scheme may be configured, such that certain second displays take precedence over other second displays.

Note further that the control device may command the content playback device to play content by sending to the content playback device over the local network commands coded as if they were sent from an infrared remote control, specifically for example the commands may be in the Sony Infrared Remote Control System (SIRCS) protocol.

Figure 3:
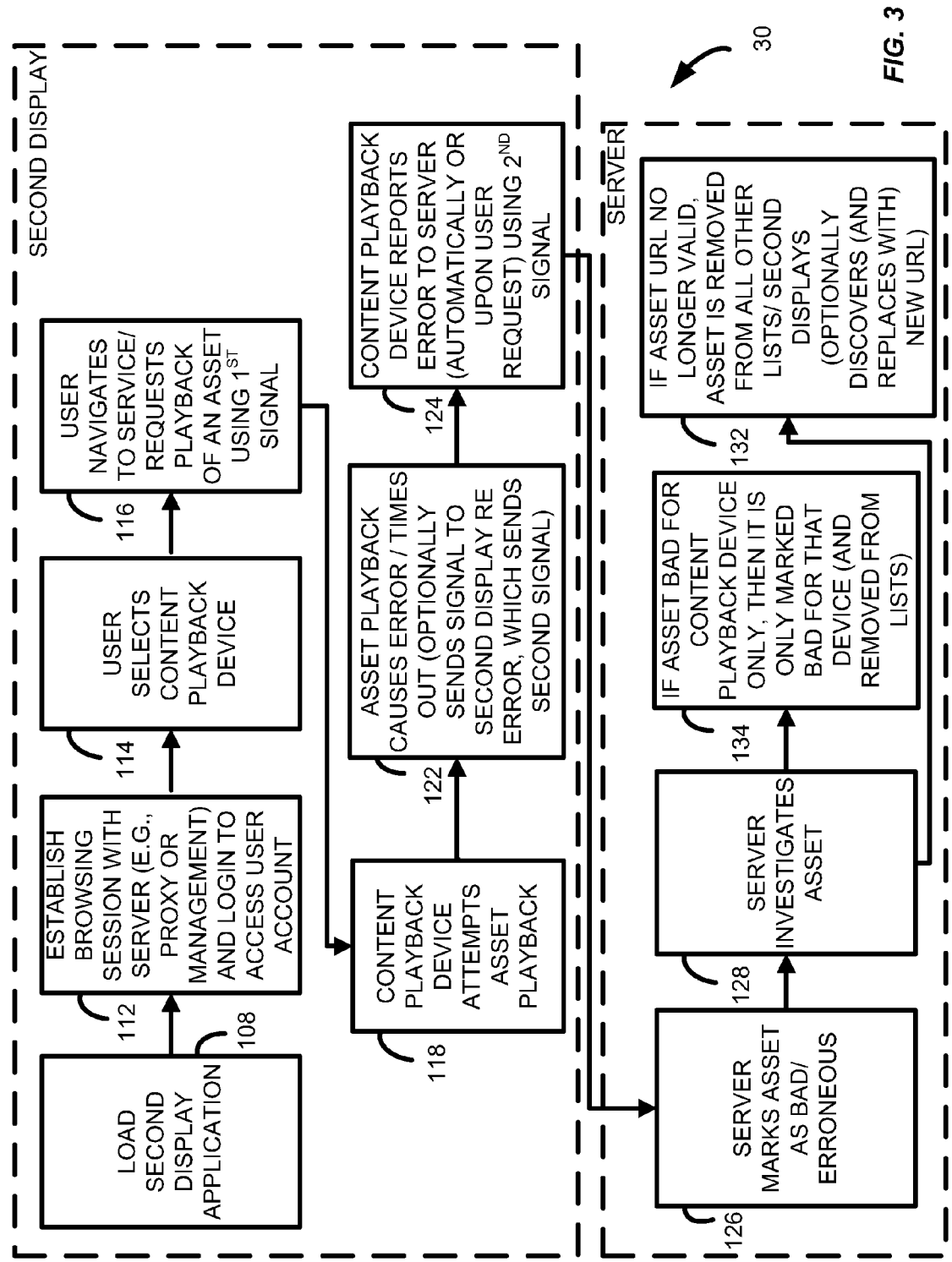
FIG. 3 is a flowchart illustrating an exemplary method according to yet another aspect of the present principles.
Figure 4:
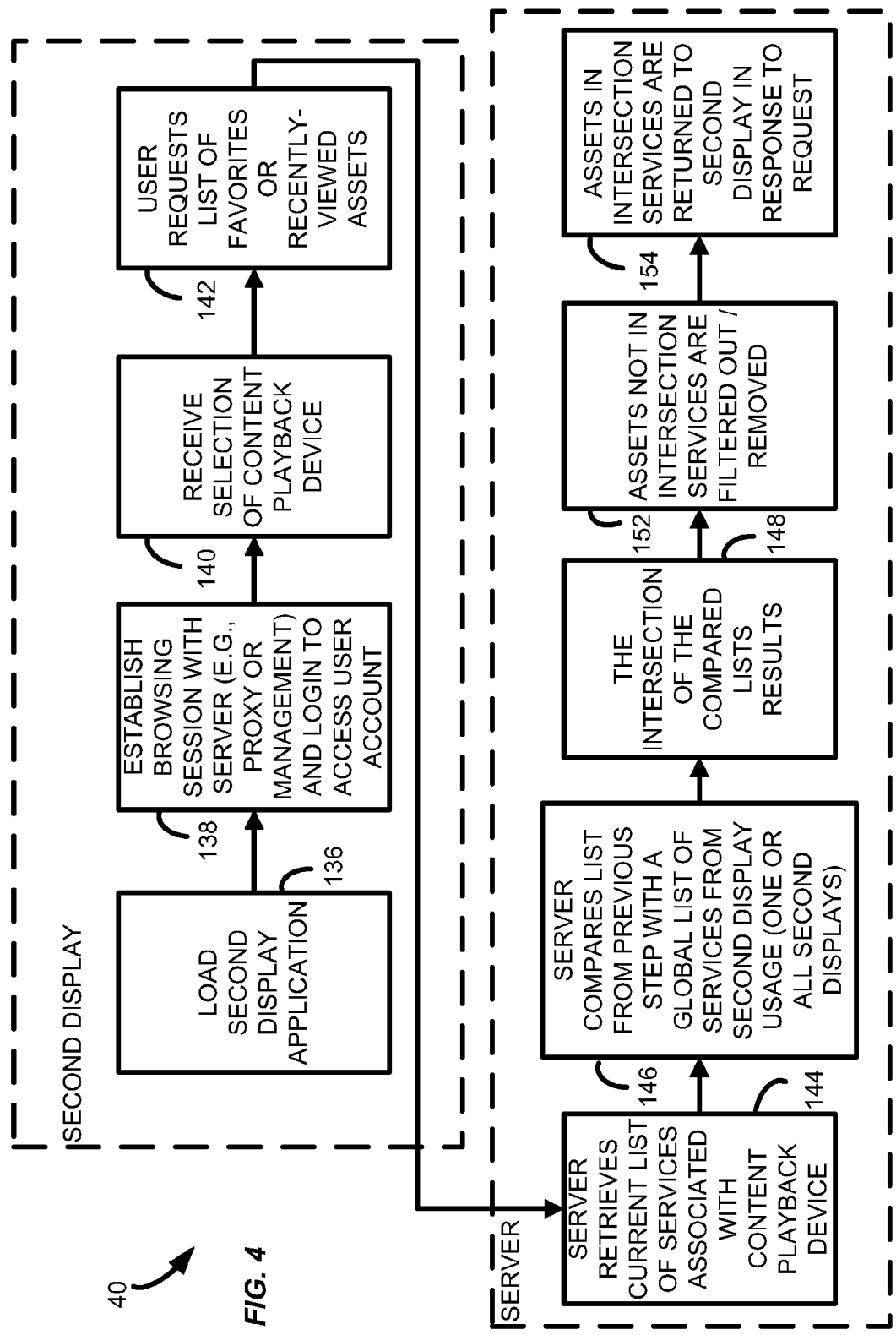
FIG. 4 is a flowchart illustrating another exemplary method according to a further aspect of the present principles.

FIG. 3 is a flowchart 30 exemplifying one way to implement a method to update and maintain, e.g., clean out, favorites or recently-viewed lists, so as to eliminate bad assets. In FIGS. 3 and 4, steps have been group so as to represent steps taken by the second display and steps taken by the server. One of ordinary skill in the art will understand that certain steps may be performed by either. In addition, various other or subsidiary steps may be undertaken by one device even within a group of steps performed by the other. One of ordinary skill in the art, given this teaching and the context, will understand how the steps work together to achieve the principles described here.

A first step is to load a second display application on a second display (step 108), and to establish a browsing session with a server, the browsing session generally associated with a user account (step 112). The server may be a management server or a proxy server as discussed above. A next step, which is optional, is to provide the server with an identifier of a content playback device (step 114). By doing so, results returned may be filtered based on the type of content playback device or in part dictated by the digital rights allowed to the content playback device.

A next step is to navigate to a service and request playback of an asset from the service (step 116), e.g., using a first signal sent by the second display or content playback device. Using the principles described above in the sequence diagram of FIG. 2, the content playback device attempts to playback the asset selected (step 118), using its authentic credentials. Where the asset is bad, the attempt at asset playback will result in an error (step 122). For example, the attempt may "timeout". The error may be reported to the second display for transmission to the server via a second signal, or the content playback device may report the error to the server (step 124) using the second signal. Such a reporting may be caused to occur either automatically or upon user request or prompting.

Steps more related to the server may then occur. For example, the server may mark the asset as bad or erroneous upon receipt of the second signal from the content playback device or second display (step 126). Such a reporting may cause the server to investigate the asset (step 128). Two variations may occur at this point. If the asset is bad for the content playback device only, the asset may be marked bad for that device, and removed from lists that the device may access (step 134). Nevertheless, the asset may remain in the system as the asset may not be bad for other users or devices. However, if the asset URL is no longer valid, the asset may be removed from the lists associated with the user (step 132). Information about the bad asset may then be employed to clean out other user accounts, by removing the asset from the lists of other users. In this way, the vast majority of users will not experience the erroneous asset because another user has already helped clean their list of that erroneous asset.

In one variation, the user or server can search for a replacement asset URL that pertains to the bad asset, and if a valid replacement asset URL can be found, the same may take the place of the one removed. Where URLs are hid from exposure, the management server or proxy server may perform the search, or cause another server to do so.

The flowchart in FIG. 4 pertains to another type of "bad" asset, i.e., those associated with services that have been removed from the content playback device. In such systems, the asset hosted by the service should no longer be presented to the user.

A first step is again to load a second display application (step 136). The nature of the second display application has been discussed above. A next step is to establish a browsing session between the second display and a server, the browsing session associated with the user account (step 138). In some instances, no user account is required, but a user may be prompted to create one, or to create an affiliation with a service. A next step, which is optional, is for the server to receive an identifier of a content playback device (step 140). A next step is that a user requests a list of favorite assets or a list of recently-viewed assets (step 142). Steps 136, 138, and 142 generally occur primarily within the context of the second display. The following steps primarily occur within the context of a server.

A next step is for the server to retrieve a current list of services associated with the selected content playback device (step 144). The server then retrieves a global list of services based on usage, e.g. usage of a second display. The usage may be based on one second display or on all the second displays within the household. Other variations will also be understood. The server compares the two lists (step 146), and the result is an intersection, or common set of services, between the two lists (step 148). Certain services will not be in the intersection. For those, assets corresponding to the services are filtered out and removed (step 152). On the other hand, assets that are in the intersection pertain to services that continue to have rights within the content playback device. Accordingly, assets corresponding to or from intersection services are returned to the second display. That is, by filtering out services, assets are correspondingly filtered out.

Figure 5:
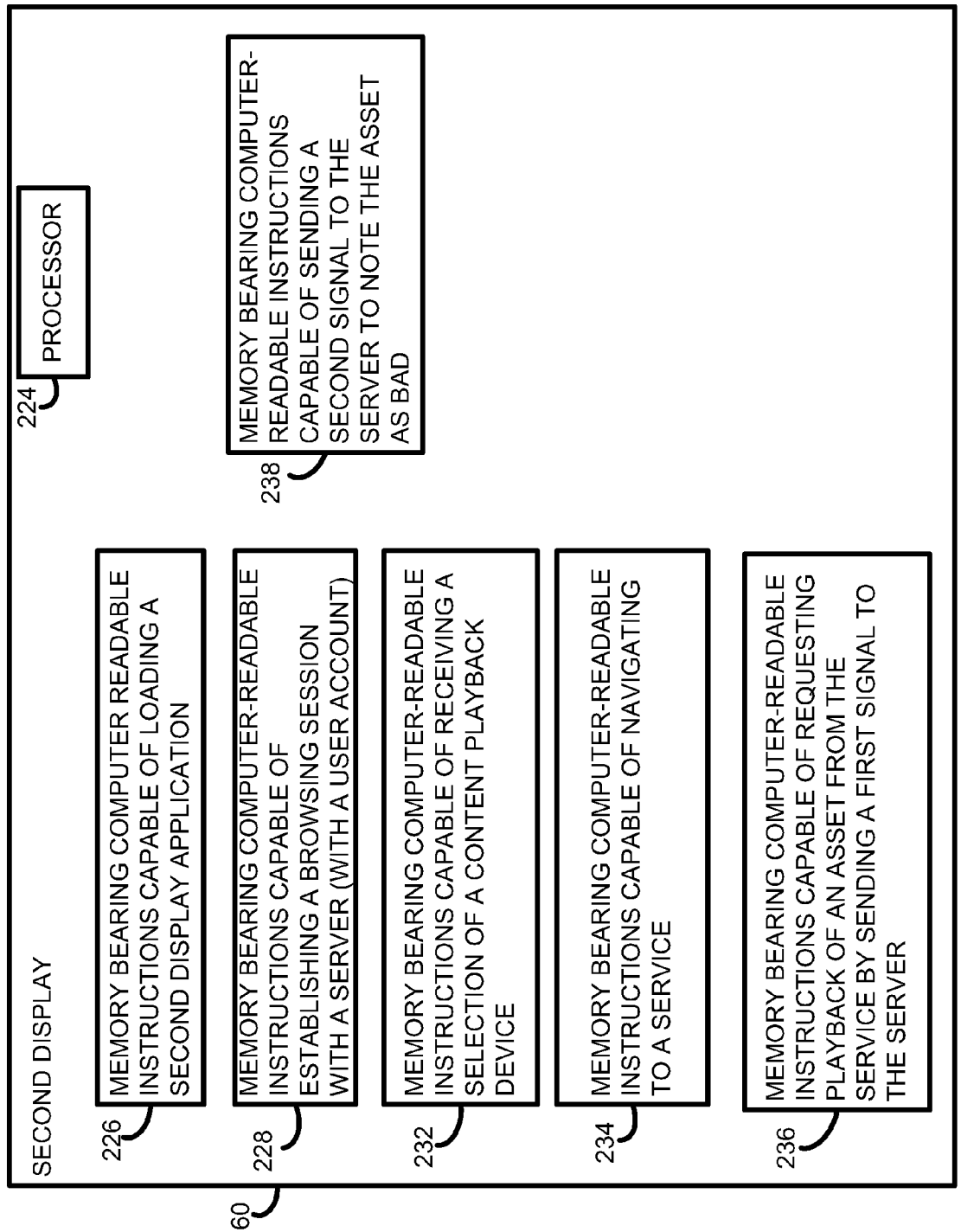
FIG. 5 is a block diagram of an exemplary second display system in accordance with another aspect of the present principles.

FIG. 5 illustrates one implementation of a second display 60. The second display 60 may include a processor 224 and memory 226 bearing computer-readable instructions capable of loading a second display application. Using memory 226, the second display may load the second display application and prepare the same for use in browsing services, content lists, and content items. The second display 60 further includes memory 228 bearing computer-readable instructions capable of establishing a browsing session with a server. As noted above, the browsing session may typically be associated with the user account, or the user may be prompted to create one upon the establishment of the session. The second display 60 may further include memory 232 bearing computer-readable instructions capable of receiving a selection of a content playback device. The second display 60 may further include memory 234 bearing computer-readable instructions capable of navigating to a service. In this sense, the term "navigating" is intended to encompass any way in which a service may be visited using a second display, either alone or in combination with a content playback device or other device with authentic credentials.

The second display 60 may further include memory 236 bearing computer-readable instructions capable of requesting playback of an asset from the service by sending a first signal to the server, i.e., a proxy or management server. The second display 60 further includes memory 238 bearing computer-readable instructions capable of sending a second signal to a server to note that an asset has been determined to be bad. The second display may send the second signal itself or may cause the content playback device to do so on. Alternatively, the content playback device may be programmed to do so on its own in response to such an error.

Figure 6:
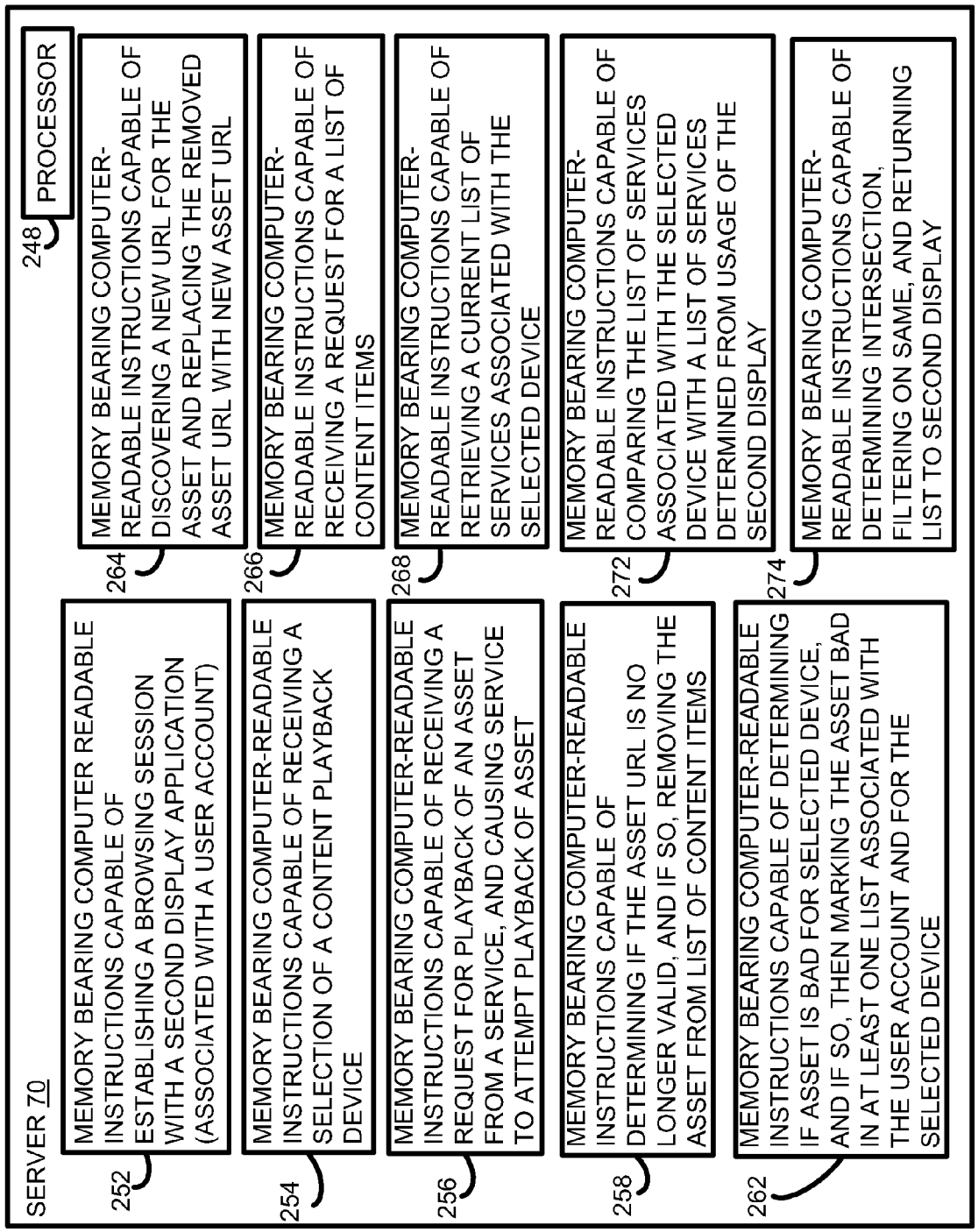
FIG. 6 is a block diagram of an exemplary server system in accordance with another aspect of the present principles.

FIG. 6 illustrates an implementation of a server 70 which may be employed to perform one or more of the methods described above. The server 70 may represent a management server, the proxy server, or other servers as may be needed to practice the systems according to the principles disclosed here. It is noted that in any of the memories disclosed, for both FIG. 5 or 6, more than one memory may be employed to accomplish the task. Individual memories as disclosed herein are provided for illustrative and non-limiting purposes. In addition, it is noted that not all memories are required, and that the memories shown may be combined in various ways to accomplish the principles described.

The server 70 includes a processor 248 and a memory 252 bearing computer-readable instructions capable of establishing a browsing session with a second display application. The browsing session is generally associated with a user account, or the server may prompt the user to create one. The server 70 further includes memory 254 bearing computer-readable instructions capable of receiving a selection of a content playback device. As noted above, such memory may not be required in every implementation. The server 70 further includes memory 256 bearing computer-readable instructions capable of receiving a request for playback of an asset from a service, the request coming from a second display. This memory 256 may further cause the service to attempt playback of an asset on the selected content playback device. The server 70 further includes memory 258 bearing computer-readable instructions capable of determining if the selected asset URL is no longer valid. If the asset URL is no longer valid, the asset may be removed, by the action of the memory and instructions thereon, from the list of content items. In addition, the asset URL may be removed from any other lists associated with the user account. Even further, the asset URL may be removed from any other lists to which the server has access. In this way, encountering a bad asset by one user can lead to an automatic updating of all other users' lists to eliminate or reduce the chance subsequent users will face the frustration and inconvenience of encountering, by attempting to access, the bad asset.

The server 70 further includes memory 262 bearing computer-readable instructions capable of determining if an asset is bad for a selected device. If the asset is determined to be bad only for the selected device, or for the user account, then the asset is so marked in at least one list associated with the user account and for the selected device, e.g., a favorites list, a recently-viewed list, or a combination or in the multiplicity of such lists. The server 70 further includes optional memory 264 bearing computer-readable instructions capable of discovering a new URL for the bad asset and replacing the removed asset URL with the new asset URL. In this way, the bad asset may be remedied. Such discovery of new URLs may be performed by the user, but generally may be performed by the server.

The following memories may be used in combination with the memories above, or in a separate method. The server 70 further includes memory 266 bearing computer-readable instructions capable of receiving a request for a list of content items. The server 70 further includes memory 268 bearing computer-readable instructions capable of retrieving a current list of services associated with the selected device. The server 70 further includes memory 272 bearing computer-readable instructions capable of comparing the list of services associated with the selected device with a list of services determined from usage of the second display. For example, many services may be accessed by a second display, including ones that a user no longer has access to at a given time, and the ones that are not playable on the selected content playback device. The memory 272 compares the services properly affiliated and configured for use with the content playback device with the list of services that may have been accessed on a second display. A memory 274 is then provided bearing computer-readable instructions capable of determining the intersection between these two sets of services, i.e., the common set of services, and returning a list to the second display of content items, where the content items displayed are those from the common list of services only. That is, services to which the user no longer has access, and which would thus result in bad assets, are filtered out. By filtering out the services, the content items can be filtered out as well. As noted above, e.g., with respect to the memory 274, as well as others, the tasks may be accomplished by several different physical memories.

Systems and methods have been disclosed that allow improvement of the user experience of the IPTV without adding to the hardware costs of the unit. The systems and methods allow for updating and maintaining favorites or recently viewed lists by removing bad, unavailable, or erroneous assets therein.

Figure 7:
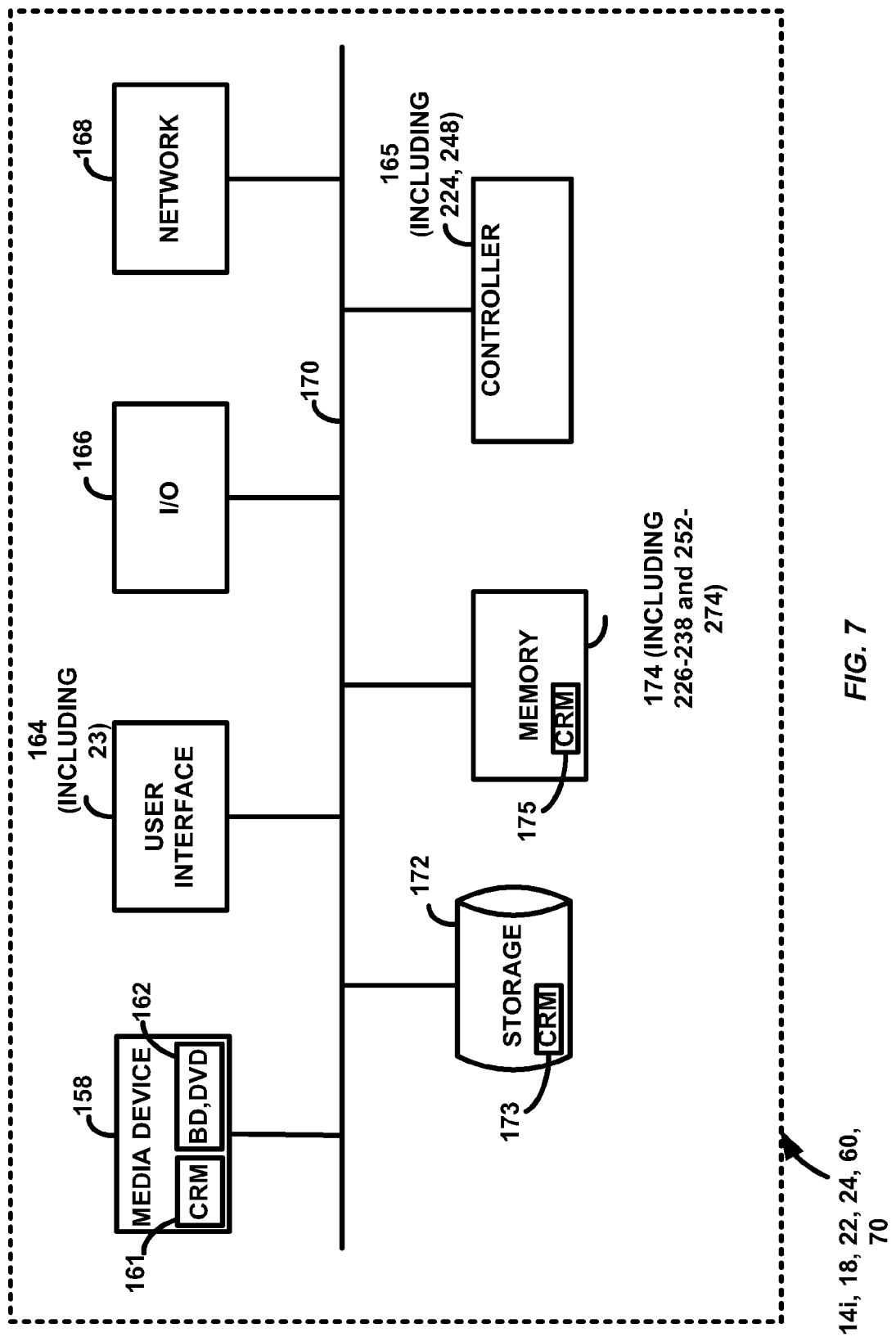
FIG. 7 illustrates an exemplary computing environment, e.g., that of the disclosed second display, proxy server, management server, or content server.

One implementation includes one or more programmable processors and corresponding computing system components to store and execute computer instructions, such as to execute the code that provides the second display or various server functionality, as well as for browsing. The second display 14i functionality will be focused on here, but it will be understood that the various server functionality, e.g., that of the proxy server 22, management server 18, and content server 24, may also be accomplished with such components. Referring to FIG. 7, a representation of an exemplary computing environment for a second display or server is illustrated.

The second display or server includes a controller 165, a memory 174, storage 172, a media device 158, a user interface 164, an input/output (I/O) interface 166, and a network interface 168. The components are interconnected by a common bus 170. Alternatively, different connection configurations can be used, such as a star pattern with the controller at the center.

The controller 165 includes a programmable processor and controls the operation of the second display 14i and its components. The controller 165 loads instructions from the memory 174 or an embedded controller memory (not shown) and executes these instructions to control the system. For example, in its execution, the controller 165 may provide the second display 14i control of a content playback device system 12 as, in part, a software system. Alternatively, this service can be implemented as separate modular components in the controller 165 or the second display 14i.

Memory 174, which may include non-transitory computer-readable memory 175, stores data temporarily for use by the other components of the second display 14i, and the same may include memories 226- 238 and 252- 274 as discussed above. In one implementation, memory 174 is implemented as RAM. In other implementations, memory 174 also includes long-term or permanent memory, such as flash memory and/or ROM.

Storage 172, which may include non-transitory computer-readable memory 173, stores data temporarily or long-term for use by other components of the second display 14i, such as for storing data used by the system. In one implementation, storage 172 is a hard disc drive or a solid state drive.

The media device 158, which may include non-transitory computer-readable memory 161, receives removable media and reads and/or writes data to the inserted media. In one implementation, the media device 158 is an optical disc drive or disc burner, e.g., a writable Blu-ray® disc drive 162.

The user interface 164 includes components for accepting user input, e.g., the user content selections, from the user of the second display 14i and presenting information to the user. In one implementation, the user interface 164 includes a keyboard, a mouse, audio speakers, and a display. The controller 165 uses input from the user to adjust the operation of the second display 14i.

The I/O interface 166 includes one or more I/O ports to connect to corresponding I/O devices, such as external storage or supplemental devices, e.g., a printer or a PDA. In one implementation, the ports of the I/O interface 166 include ports such as: USB ports, PCMCIA ports, serial ports, and/or parallel ports. In another implementation, the I/O interface 166 includes a wireless interface for wireless communication with external devices. These I/O interfaces may be employed to connect to one or more content playback devices.

The network interface 168 allows connections with the local network and optionally with content playback device 12 and includes a wired and/or wireless network connection, such as an RJ-45 or Ethernet connection or "Wi-Fi" interface (802.11). Numerous other types of network connections will be understood to be possible, including WiMax, 3G or 4G, 802.15 protocols, 802.16 protocols, satellite, Bluetooth®, or the like.

The second display 14i may include additional hardware and software typical of such devices, e.g., power and operating systems, though these components are not specifically shown in the figure for simplicity. In other implementations, different configurations of the devices can be used, e.g., different bus or storage configurations or a multi-processor configuration.

Various illustrative implementations of the present invention have been described. However, one of ordinary skill in the art will recognize that additional implementations are also possible and within the scope of the present invention. For example, while in some implementations the second display application running on the second display has been disclosed as a web application, and potentially including a plug-in or helper application, the same may be a native application, a Java application, or any other sort of application that may work with a content playback device. While a favorites and recently-viewed list have has been discussed in the singular, a user may maintain a number of such lists for various purposes, e.g., for various categories of favorites, and various recently-viewed lists for various user profiles within a user account.

Moreover, while several implementations of the invention include that the user select a particular content playback device for playback, in some implementations a user may browse content with no content playback device selected at all. In other implementations, a cache or cookie or other information may be employed to store information about content playback devices, so that no user choice is necessary. In another example, samples of content items may be obtained from content service providers, and these samples may be browsed freely without a user selection of a content playback device for playback. In another variation, a profile system may be employed that communicates content playback device information upon start-up according to a profile; e.g., a given content playback device may always be associated with and may authenticate itself with a given service provider. In this sense, a content playback device is still being chosen, but the choice does not require an affirmative step by the user. Use of any of these alternatives, or others, ensures that the content consumption of each content playback device is tracked. It further allows, as described, the proxy server to filter out content that the content playback device is incapable of playing. It is also noted that certain types of browsing may require no device at all, e.g., browsing shopping sites. Still, some level of customization may occur, e.g., by consideration of the origination location of the visiting second display's IP address.

Content items from any suitable source are contemplated, including but not limited to: networked, wireless, including 3G, 4G, and the like, local, e.g., from a local or shared drive or accessible via DLNA or accessible via a specialized network storage device, or accessible via removable media such as a media card or USB storage device, CD, DVD, or Blu-ray®. Content may also be accessed from a cell phone, portable media player, camera or camcorder, or other devices the second display may access. In addition, any suitable types of content items are contemplated, including but not limited to AC3, MP3, MPEG, etc. Any suitable format of content items is contemplated, including but not limited to m3u, ASX, ASX-XML, etc. Any suitable protection scheme is contemplated, including but not limited to DRM, etc. Any suitable protocol is contemplated, including but not limited to HTTP, HTTPS, etc. Any suitable playback method is contemplated, including but not limited to those varying in buffering limit, when to buffer, treating video playback differently from audio playback, and the like.

In addition, the above description was primarily directed to an implementation in which the local IP address of the second display was retrieved and stored on the server. However, other ways of discovering the second display are also possible. For example, device discovery is also possible using a broadcast method within the local network. Compatible devices that recognize the broadcast message will respond with their necessary credentials and information to indicate their compliance with the web application for the second display. In many cases, broadcasting methods are primarily directed to native applications, not web applications; however, a broadcasting library may be employed to allow the implementation within a web application. It is additionally noted that broadcasting methods may be employed in the discovery of content playback devices by second displays, such as via Bluetooth®, infrared, or the like.

While the above description has focused on implementations where a second display is coupled to a content playback device through a local network, it will be understood that the same will apply to any method by which the two may communicate, including 3G, 4G, and other such schemes.

Accordingly, the present invention is not limited to only those implementations described above.

The invention claimed is:

1. A method of updating a list of content items, comprising:
   i. establishing a browsing session between a second display and a server, and associating the browsing session with a user account of a user;
   ii. receiving a selection of a content playback device;
   iii. loading a list of content items on the second display;
   iv. requesting playback of an asset from the list from a service by sending a first signal from the second display to the server, the first signal causing the service to access a URL associated with the asset to attempt playback of the asset on the selected content playback device using the credentials of the content playback device;
   v. upon an unsuccessful attempt to playback the asset, removing the asset URL from the list and sending a second signal to the server, whereby the asset URL is noted as a bad asset URL; and
   vi. discovering a new URL for the asset, and replacing the removed asset URL with the new URL, in the list of content items.

2. The method of claim 1, wherein the list is a list of favorites or a list of recently-viewed assets.

3. The method of claim 1, wherein the server is a management server.

4. The method of claim 1, wherein the second signal is sent automatically.

5. The method of claim 1, wherein the second signal is sent upon user direction.

6. The method of claim 1, wherein the requesting playback of an asset from a service includes selecting the service from a list of favorite services.

7. The method of claim 1, wherein the second signal is sent upon receipt of an error message from the content playback device.

8. A non-transitory computer-readable medium, comprising instructions for causing a computing device to implement the method of claim 1.

9. A method of updating a list of content items associated with a first user account, comprising:
   i. establishing a browsing session between a second display and a server, the browsing session associated with a first user account;
   ii. receiving a selection of a content playback device;
   iii. receiving a request for playback of an asset from a service, and causing the service to attempt playback of the asset on the selected content playback device using the credentials of the content playback device;
   iv. upon receiving a signal from the second display or the content playback device indicating that the attempt was unsuccessful, marking the asset as bad;
   v. determining if the asset URL is no longer valid, and if the asset URL is no longer valid, removing the asset from at least one list of content items including the asset, the list associated with the first user account, and further removing the asset from at least one other list of content items; or vi. determining if the asset is bad for the selected content playback device, and if the asset is bad for the selected content playback device, then marking the asset bad in at least one list containing the asset, the list associated with the user account and for the selected content playback device; and vii. discovering a new URL for the asset, and replacing the removed or marked asset URL with the new URL, in the lists of content items associated with the first user account and with the other list of content items.

10. The method of claim 9, wherein the list is a list of favorites or a list of recently-viewed assets.

11. The method of claim 9, wherein the server is a management server.

12. The method of claim 9, wherein the at least one other list is associated with a second user account.

13. The method of claim 9, wherein the at least one other list is associated with the first user account.

14. A non-transitory computer-readable medium, comprising instructions for causing a computing device to implement the method of claim 9.

\* \* \* \* \*